No. 688,684. Patented Dec. 10, 1901.
C. PIEZ.
BUCKET ELEVATOR.
(Application filed Sept. 7, 1901.)

(No Model.)

Witnesses:

Inventor:
Charles Piez,
by his Attorneys

UNITED STATES PATENT OFFICE.

CHARLES PIEZ, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

BUCKET ELEVATOR.

SPECIFICATION forming part of Letters Patent No. 688,684, dated December 10, 1901.

Application filed September 7, 1901. Serial No. 74,611. (No model.)

*To all whom it may concern:*

Be it known that I, CHARLES PIEZ, a citizen of the United States, residing in Philadelphia, Pennsylvania, have invented certain Improvements in Bucket Elevators, of which the following is a specification.

The object of my invention is to prevent the premature discharge of material from a bucket elevator as the buckets pass around the head-wheel, so that the material can be transferred from the buckets to the chute with the least amount of breakage. This object I attain by providing a yielding shield at the head of the elevator, so as to retain the material in the buckets until the point at which it is wished to discharge the buckets is reached.

Figure 1:
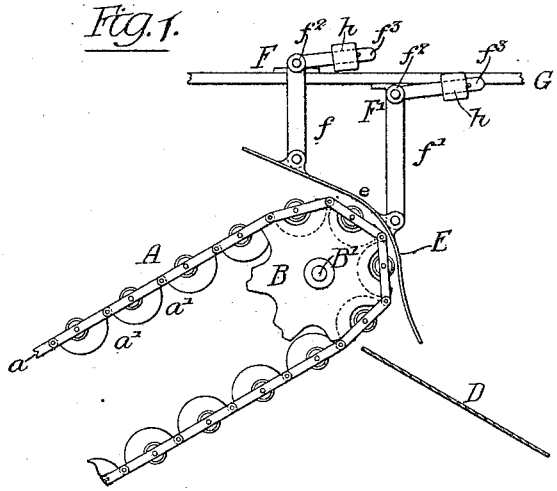
Figure 2:
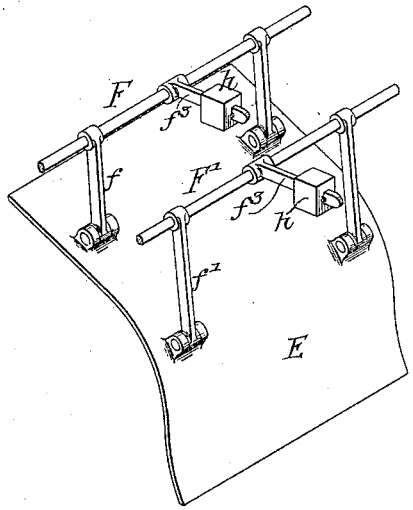
Figure 3:
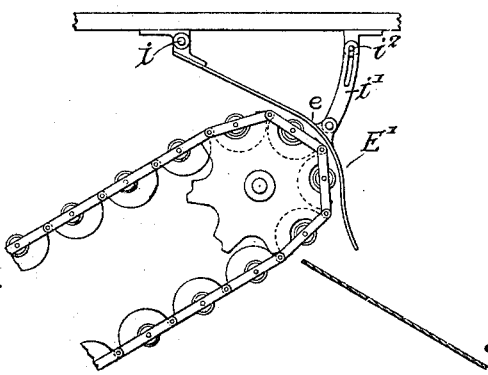

In the accompanying drawings, Figure 1 is a side view of the head of a bucket conveyer, showing my improved shield. Fig. 2 is a detached perspective view of the shield, and Fig. 3 is a view of a modification.

A is an endless-belt conveyer, consisting of two endless chains $a$, which pass around a head-wheel B on the shaft B', and carried by the chains are buckets $a'$. The conveyer is arranged on an incline and may be of any length desired.

D is a chute situated directly under the head of the conveyer, so arranged as to receive the material from the buckets as the same is discharged in passing around the head-wheel B. In order that the entire contents of each bucket may be discharged from the head of the conveyer, the chute D is situated directly under the head and in a position to receive the last particle of material from each bucket, and as soon as a bucket turns around the head-wheel some of the particles of the material will without the use of my invention fall a considerable distance onto the chute, and, furthermore, when the elevator is run at a high speed the material is often thrown from the conveyer, causing breakage. Such material as anthracite coal must be handled very carefully in order to prevent undue breakage. Consequently by the use of my invention the material is retained in the conveyer-buckets until a point is reached as near as possible to the chute, so that the material can be transferred from the bucket to the chute with the least amount of breakage.

In order to prevent the premature discharge of the material as the buckets pass around the head-wheel, I provide a shield E, which shield has a curved portion $e$ and is preferably shaped, as shown in the drawings, so as to rest as near as possible to the head of the elevator. In the present instance I hang the shield E from arms $f f'$, secured to two rock-shafts F F', which are hung at $f^2$ to beams G or other suitable supports. On the rock-shafts F F' are arms $f^3$, which are provided with weights $h$, such weights being capable of adjustment on the arms $f^3$ to any point desired. If, for instance, the elevator is carrying anthracite coal, the buckets will turn around the head-wheel and the shield will hold the coal in the buckets until a discharge-point is reached directly above the chute. The shield will also prevent the premature discharge of the coal from the buckets when the elevator is running at a high speed.

In Figs. 1 and 2 I have shown the shield hung from a pair of levers, while in Fig. 3 I have shown the shield E' pivoted at $i$ and provided with a slotted pivoted arm $i'$. A pin $i^2$ on the bracket passes through the slot and limits the movement of the shield, so that if the material strikes the shield said shield will simply swing on its pivot.

I claim as my invention—

1. The combination of a bucket elevator, with a yielding shield situated at the point where the buckets turn around the head-wheel, and arranged to retain the materal in the buckets until the point at which it is wished to discharge the material is reached, substantially as described.

2. The combination of a bucket elevator, with a shield arranged to retain the material in the bucket until the discharge-point is reached, with means for yieldingly supporting said shield, substantially as described.

3. The combination of a bucket conveyer, a head-wheel, a chute, a curved shield situated at the head of the conveyer, two rock-shafts, arms on each rock-shaft connected to the shield, and weighted arms on the rock-shafts, the whole so constructed that the shield will yield when struck by material in the conveyer, substantially as described.

In testimony whereof I have signed my name to this specification in the presence of two subscribing witnesses.

CHARLES PIEZ.

Witnesses:
WILL. A. BARR,
JOS. H. KLEIN.